United States Patent [19]

Toyoda et al.

[11] Patent Number: 5,250,634
[45] Date of Patent: Oct. 5, 1993

[54] POWDER COATING COMPOSITION

[75] Inventors: Yuji Toyoda; Akimitsu Uenaka; Tasaburo Ueno; Kouichi Tsutsui, all of Osaka, Japan

[73] Assignee: Nippon Paint Co., Ltd., Osaka, Japan

[21] Appl. No.: 723,268

[22] Filed: Jun. 28, 1991

[30] Foreign Application Priority Data

Jul. 3, 1990 [JP] Japan .................. 2-176795

[51] Int. Cl.⁵ .............. C08L 63/06; C08G 59/14; C08F 20/00
[52] U.S. Cl. .................. 525/438; 525/514; 525/533
[58] Field of Search ............ 525/438, 533, 514; 524/100, 114

[56] References Cited

U.S. PATENT DOCUMENTS 4,904,746  2/1990  Brown et al. ............ 525/438
5,034,432  7/1991  Ueno et al. ............. 523/221

FOREIGN PATENT DOCUMENTS 387692   9/1990   European Pat. Off.
2758006  7/1979   Fed. Rep. of Germany.
69935    6/1977   Japan.
118436   9/1979   Japan.
108166   7/1982   Japan.
230069   12/1984  Japan.

*Primary Examiner*—Paul R. Michl
*Assistant Examiner*—Tae H. Yoon
*Attorney, Agent, or Firm*—Wenderoth, Lind & Ponack

[57]  ABSTRACT

A powder coating comprising, as main components, (A) a carboxyl group containing resin having a number average molecular weight of 1000-30000, an acid value of 5-200 KOH mg/g and a glass transition temp. of 20°-120° C., and (B) a polyglycidyl compound obtained by addition of a polyester oligomer having 2 or more carboxyl groups and a number average molecular weight of 200-1200, with an epoxy compound of the formula:

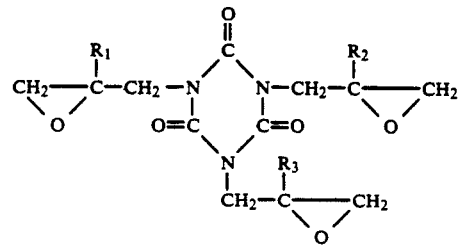

, the ratio of carboxyl groups in (A) to glycidyl groups in (B) being, in terms of equivalent ratio, 0.5 to 2.0. This powder coating may result a coating with excellent processability, impact strength and the like and is excellent in storage stability, hardening properties either at high or low temperature and even when used a stored powder may result a coating with excellent processability.

3 Claims, No Drawings

POWDER COATING COMPOSITION

FIELD OF THE INVENTION

The present invention relates to a powder coating and more specifically to powder coating comprising a carboxyl group containing resin such as polyester resin or acryl resin, and a hardening agent. The coating is excellent in properties such as processability, impact strength and the like, storage stability and hardening properties, and it is applicable to both low temperature curing and high temperature-short time curing. Even when used as a stored powder, it may produce a coating with excellent processability.

BACKGROUND OF THE INVENTION

In the powder coating field of art, polyester resin has been widely used as a base resin. Typical polyester resin is a carboxyl group containing polyester, which is usually coupled with an epoxy compound or resin as a hardening agent.

When the hardening agent is a bifunctional epoxy compound or resin such as aliphatic epoxy resin, bisphenol A type epoxy resin and the like, there are problems such that hardening is fairly poor because of deficiency in the crosslinking degree and processability of the coated product is not so good.

On the other hand, in the case of such hardening agent as novolak type epoxy resin, triglycidyl isocyanurate or other member having much higher functionality (Japanese Patent Publication(unexamined) 69935/77), though the hardening property is excellent, the thus formed coating is poor in flexibility and hence in processability of the formed product.

Also, for the purpose of improving storage stability of powder coating, there has been proposed an addition product of triglycidyl isocyanurate and polybasic acid (Japanese Patent Publication 37343/88).

However, in that technique, when sebacic acid or other polybasic acid having a higher flexibility is used, there results a coating with poor film-hardness, and when terephthalic acid or other polybasic acid having a lower flexibility is selected film-hardness is excellent but there is a problem of poor processability 1,4-cyclohexane dicarboxylic acid possesses intermediate properties of the abovementioned polybasic acids, and therefore, in this case, coating hardness and processability are moderately improved, however, this causes such additional problem that when use as a stored powder coating, there gives only a coated product with less processability.

It is, therefore, an object of the invention to provide a powder coating comprising a carboxyl group containing resin as polyester resin and acryl resin which are most popular in heretofore proposed powder coatings, and an epoxy compound or resin as a hardener, being excellent in storage stability and hardening properties in a wide temperature range of low temperature to high temperature, and capable of producing a coating with excellent processability, even when used as a stored powder coating, and impact strength and the like.

SUMMARY OF THE INVENTION

According to the invention, the abovementioned object can be realized by providing a powder coating comprising, as main components, (A) a carboxyl group containing resin having a number average molecular weight of 1,000-30,000, an acid value of 5-200 KOH mg/g and a glass transition temperature of 20° C.-120° C., and (B) a polyglycidyl compound having, on average, 2 to 6 glycidyl groups in its molecule, obtained by the addition reaction of a polyester oligomer having 2 or more carboxyl groups in its molecule and having a number average molecular weight of 200-1,200, with an epoxy compound of the formula (I);

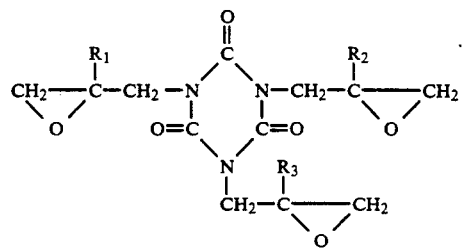

in which $R_1$, $R_2$ and $R_3$ are the same or different groups and each represents hydrogen atom or methyl group, and/or a derivative thereof having, on average, glycidyl groups in its molecule, the ratio of carboxyl groups in (A) resin to glycidyl groups in (B) being, in terms of functional group equivalent ratio, 0.5 to 2.0.

The present polyester type powder coating utilizes heretofore proposed carboxylic acid type polyester resins as a base resin. Such resins, however, should have a number average molecular weight of 1,000-30,000, preferably 1,500-8,000, an acid value of 5-200 (KOH mg/g), preferably 20-100 (KOH mg/g), and a glass transition temperature of 20°-120° C., preferably 30°-80° C.

As far as the abovementioned requirements are fulfilled, any of the heretofore proposed carboxyl group containing polyester resins for coating use may be satisfactorily used.

As the employable acid component, the following may be used; terephthalic acid, isophthalic acid, phthalic acid, methyl phthalic acid, trimellitic acid, pyromellitic acid, adipic acid, sebacic acid, succinic acid, maleic acid, fumaric acid, tetrahydrophthalic acid, methyltetrahydrophthalic acid, hexahydrophthalic acid,

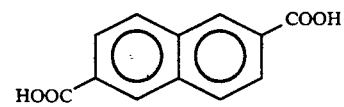

and their reactive derivatives as acid anhydride, acid halide, acid ester and the like.

Examples of alcohol component are ethyleneglycol, propyleneglycol, 1,3-butanediol, 1,4-butanediol, 1,6-hexanediol, diethyleneglycol, dipropyleneglycol, 1,4-cyclohexanedimethanol, 1,4-cyclohexanediol,

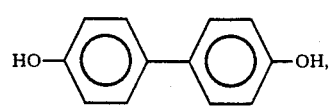

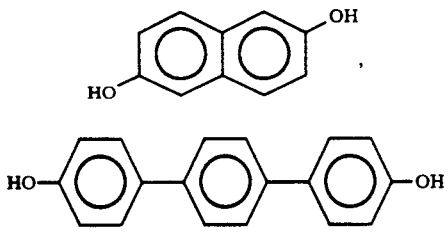

neopentylglycol, isopentylglycol, bishydroxyethyl terephthalate, hydrogenated bisphenol A, hydrogenated bisphenol-A-alkyleneoxide addition product, trimethylolethane, trimethylol propane, glycerine, pentaerythritol and the like.

Also, such compound as having both acid and hydroxyl groups may be satisfactorily used as reactive polyfunctional compound in the preparation of polyester resin.

If desired, various fatty acids may be introduced in such polyester by the so-called addition reaction.

The abovementioned acid and alcohol components are reacted according to known technique, in one or multiple stages. Among the abovementioned alcohol component, particular preference is given to neopentyl glycol. This is because when the alcohol component comprises 75% or more neopentyl glycol, there results a coating with excellent weather resistance.

To those skilled in the art, glass transition temperature (Tg) of the polyester resin may be easily controlled by the selection of appropriate materials and weight ratio thereof, and number average molecular weight and acid value of the polyester resin by the selection of reaction conditions used.

In an acrylic type powder coating, a carboxylic acid type acrylic resin, is used as a base resin and however, said resin should have a number average molecular weight of 1,000 to 30,000 and preferably 1,500 to 8,000, an acid value of 5 to 200 (KOH mg/g) and preferably 20 to 200 (KOH mg/g), and a glass transition temperature of 20° to 120° C. and preferably 30° to 80° C.

This is because if the number average molecular weight is less than 1,000, there is a shortage in coating strength, whereas if it exceeds over 30,000, there is a deficiency in flow property of coating, and hence a good appearing coating is hardly obtained.

If the acid value is less than 5, there is a tendency that coating strength is lowered, and when it exceeds over 200, there is an excessive hardening, resulting in a coating with decreased flexibility and impact strength. If the glass transition temperature is less than 20° C., there is a marked decrease in blocking resistance and if it exceeds over 120° C., there is a shortage in flowing property of the coating. As far as the abovementioned conditions are fulfilled, any of the known carboxyl group containing acrylic resins ma be satisfactorily used.

Among the constituting monomers, examples of carboxyl group containing monomer are acrylic acid, methacrylic acid and the like.

Other co-polymerizable monomers are acrylates, methacrylates and other ethylenically unsaturated monomers.

Such monomers are used each separately or in the combination of 2 or more. Examples of acrylates or methacrylates are methyl acrylate, ethylacrylate, n-propyl acrylate, isopropyl acrylate, n-butyl acrylate, isobutyl acrylate, t-butyl acrylate, cyclohexyl acrylate, 2-ethyl hexyl acrylate, octyl acrylate, 2-ethyl octyl acrylate, dodecyl acrylate, benzyl acrylate, methyl methacrylate, ethyl mithacrylate, n-propyl methacrylate, isopropyl methacrylate, n-butyl methacrylate, isobutyl methacrylate, t-butyl methacrylate, hexyl methacrylate, cyclohexyl methacrylate, 2-ethyl hexyl methacrylate, octyl methacrylate, 2-ethyl octyl methacrylate, dodecyl methacrylate, lauryl methacrylate, benzyl methacrylate, phenyl methacrylate, 2-hydroxyethyl acrylate, 2-hydroxy ethyl methacrylate, 2-hydroxy propyl acrylate, 2-hydroxy propyl methacrylate and the like.

Examples of other $\alpha,\beta$-ethylenically unsaturated co-polymerizale monomers are dialkyl esters of fumaric acid as diethyl fumarate, dibutyl fumarate and the like; dialkyl ester of itaconic acid as diethyl itaconate, dibutyl itaconate and the like; styrene, vinyl toluene, $\alpha$-methylstyrene, acrylonitrile, methacrylonitrile, acrylamide, methacrylamide, methylol acrylamide, alkoxymethylolamide, vinyl oxazoline, vinylacetate, vinyl propionate, lanryl vinyl ether and the like.

The present powder coating is characterized in that to a carboxyl group containing resin, a particular hardening agent is compounded. Such hardening agent is a polyglycidyl compound (B) having, in average, 2 to 6 glycidyl groups in its molecule, obtained by the addition reaction of a polyester oligomer having a number average molecular weight of 200 to 1,200 and having 2 or more carbonyl group in its molecule, with an epoxy compound (I) of the formula:

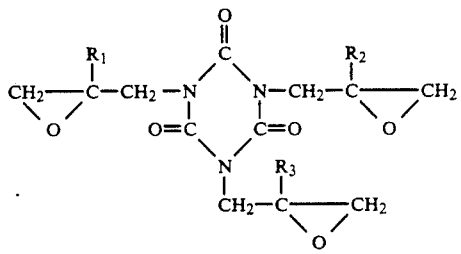

in which $R_1$, $R_2$ and $R_3$ are the same or different and each represents hydrogen atom or methyl group, and/or a derivative of said epoxy compound (I) having 2 or more, in average, glycidyl groups in its molecule.

The abovementioned carboxyl group containing polyester oligomer may be prepared by using a conventional method with appropriate starting materials, however, it should have a number average molecular weight of 200 to 1,200 and preferably 200 to 800.

This is because if the number average molecular weight is less than 200, it is hardly possible to formulate a powder coating, whereas if it exceeds over 1,200, there is a shortage of flow property of coating, resulting in a poor appearance coating.

As mentioned above, particular polyglycidyl compounds (B) are used as a hardening agent in this invention. However, such compound should have 2 to 6, preferably 3 to 4, in average, glycidyl groups in its molecule.

This is because if the average number of glycidyl groups is less than 2, there is a shortage in hardening property, resulting in a coating with lesser strength, whereas if it exceeds over 6, then an over-hardening occurs resulting in a coating with decreased flexibility and hence, a coated product with hard processability.

For example, when 1 mol of polyester oligomer having 2 carboxyl, groups in its molecule is reacted with 2 moles of triglycidyl isocyanurate (abreviated as TGIC), the following 4-functional glycidyl compound should theoretically be obtained,

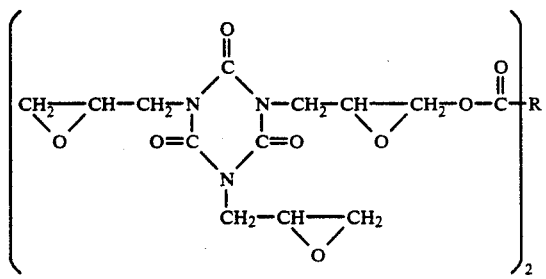

however, in practice, such by-products as being produced by the reaction of 2 to 3 glycidyl groups of triglycidyl isocyanurate with carboxyl group of the polyester oligomer may be allowed to coexist in the reaction product.

If desired, a part of said compound (B) may be substituted with other epoxy compound or resin having 2 or more glycidyl groups in its molecule. Examples of such epoxy compounds are bisphenol A type epoxy resin, butanediol diglycidyl ether, glycerol polyglycidyl ether, diglycidyl terephthalate, triglycidyl trimellitate and the like.

In this invention, said (A) and (B) are compounded in a ratio of carboxyl groups in resin (A)/glycidyl groups in the hardener(B) of from 0.5 to 2.0, and preferably from 0.5 to 1.5. If the abovementioned functional group equivalent ratio is less than 0.5, hardening degree of the coating is too low and when the said ratio exceeds over 2.0, then the hardening degree is too high, resulting in a coating with decreased flexibility and bending properties. Both cases are, therefore, undesirable.

The present powder coating contains as main ingredients, the abovementioned base resin and hardening agent, however, it may include other various powder coating additives as desired. Examples of such additives are (a) surface regulating agent for the control of generation of crater and improvement in coating smoothness, as, for example, long chain alkyl ester of acrylic acid , polysiloxane and the like, (b) coloring pigment as, for example, inorganic pigments as titanium dioxide, iron red, yellow iron oxide and the like, and organic pigments as carbon black, phthalocyanine blue, phthalocyanine green, quinacridone red pigment and the like, (c) plasticizer as polyalkylene polyol, phthalic acid ester, and the like, (d) ultraviolet ray absorber and antioxidant, (e) pinehol controlling agent as benzoin and the like, (f) hardening catalyst as imidazole and the like.

The present powder coating may be prepared following the conventional procedures comprising pre-mixing the base resin, hardening agent and other optional additives, melt-mixing at about 100° C., cooling, pulverizing the formed mass and sieving the same.

Thus obtained powder coating may be applied onto a substrate by using any conventional methods, including electrostatic spraying, fluidized bed coating and the like. Since a polyglycidyl compound is used as a hardener, the present powder coating is excellent in hardening properties. Tg and number average molecular weight of the hardening agent are controlled each in defined values, the hardening agent may be offered as a solid, for which reason the present powder coating is excellent in blocking resistance and even when the stored product is used, the processing property of the coated material is excellent, too. Though an isocyanurate ring is included in the present hardening agent, it is excellent in flexibility because of the presence of ester bonding and the present hardening agent is far superior to triglycidyl isocyanurate in hardening properties. The present powder coating is thus excellent in flexibility of the formed coating, suitable not only for high-temperature-short time baking but also for low temperature baking and capable of resulting a coating with excellent coating appearance and higher qualities. Therefore, this powder coating is very useful for the coating of household appliance , office goods and the like.

The invention shall be now more fully explained in the following Examples. Unless otherwise being stated, all parts and percentages are by weight.

EXAMPLE 1

100 parts of Resin P-7309 (carboxyl group containing polyester resin, Mn=4000, Tg=63, AV=33, manufactured by EMS Co., Ltd.), 19.3 parts of an addition product (A) obtained by reacting 1 mole of neopentylglycol and 2 moles of hexahydro phthalic anhydride (HHPA) and further reacting with 2 moles of triglycidyl isocyanurate (TGIC) (epoxy equivalent 288 g/eq)(theoretical structure: TGIC-HHPA-neopentylglycol-HHPA-TGIC), 67 parts of titanium dioxide CR-50 (pigment, manufactured by Ishihara Sangyou), 1.1 parts of benzoin (pinehole controlling agent) and 0.4 part of silicone YF-3919 (surface regulating agent, manufactured by Toshiba Silicone) were pre-mixed and the mixture was subjected to melt-mixing, cooling, pulverizing and then sieving through 150 mesh sieve to obtain a powder coating.

Using an electrostatic spray coating method, the abovementioned powder coating was applied onto a zinc phosphated steel plate (0.6 mm thickness) to a dry film thickness of 40 microns and the coating was baked at 180° C. for 20 minutes. Processing property, impact strength, hardness of thus obtained coating and processability of the coated product when used a stored powder coating were examined and the test results were shown in Table 3.

EXAMPLE 2

The similar experiments as given in Example 1 were repeated excepting changing the baking conditions to 250° C. and 5 minutes.

EXAMPLE 3

The similar experiments as given in Example 1 were repeated excepting changing the baking conditions to 160° C. and 20 minutes.

EXAMPLE 4

100 parts of polyester resin P-7309), 19.0 parts of an addition product (B) obtained by reacting 1 mole of neopentylglycol and 2 moles of terephthalic acid and further reacting with 2 moles of triglycidyl isocyanurate (TGIC) (epoxy equivalent 288 g/eq), 66 parts of titanium dioxide CR-50, 1.1 parts of benzoin and 0.4 part of silicone YF-3919 were pre-mixed and a powder coating was prepared as in Example 1. This powder coating was applied onto a zinc phosphated steel plate as in example 1 and tested. Test results are shown in Table 3.

EXAMPLE 5

100 parts of polyester resin P-7309), 19.8 parts of an addition product (C) obtained by reacting 1 mole of neopentylglycol and 1 moles of hexahydro phthalic anhydride and 1 mole of tetrahydrophthalic anhydride and further reacting with 2 moles of triglycidyl isocyanurate (TGIC) (epoxy equivalent 290 g/eq), 67 parts of titanium dioxide CR-50, 1.1 parts of benzoin and 0.4 part of silicone YF-3919 were pre-mixed and a powder coating was prepared as in Example 1. This powder coating was applied onto a zinc phosphated steel plate as in example 1 and tested. Test results are shown in Table 3.

EXAMPLE 6

100 parts of polyester resin P-7309), 14.0 parts of an addition product (D) obtained by reacting 1 mole of hydroxypyvaric acid and 1 moles of hexahydro phthalic anhydride and further reacting with 2 moles of triglycidyl isocyanurate (TGIC) (epoxy equivalent 212 g/eq), 63 parts of titanium dioxide CR-50, 1.1 parts of benzoin and 0.4 part of silicone YF-3919 were pre-mixed and a powder coating was prepared as in Example 1. This powder coating was applied onto a zinc phosphated steel plate as in example 1 and tested. Test results are shown in Table 3.

EXAMPLE 7

100 parts of polyester resin P-7309), 28.4 parts of an addition product (E) obtained by reacting 1 mole of neopentylglycol and 2 moles of hexahydro phthalic anhydride and further reacting with 1.5 moles of triglycidyl isocyanurate (TGIC) (epoxy equivalent 430 g/eq), 71 parts of titanium dioxide CR-50, 1.1 parts of benzoin and 0.4 part of silicone YF-3919 were pre-mixed and a powder coating was prepared as in Example 1. This powder coating was applied onto a zinc phosphated steel plate as in example 1 and tested. Test results are shown in Table 3.

EXAMPLE 8

100 parts of polyester resin P-7309), 15.2 parts of an addition product (A) stated in Example 1, 2.5 parts of YD-128 (bisphenol A type epoxy resin, epoxy equivalent 190 g/eq, Tohto Kasei ), 65 parts of titanium dioxide CR-50, 1.1 parts of benzoin and 0.4 part of silicone YF-3919 were pre-mixed and a powder coating was prepared as in Example 1. This powder coating was applied onto a zinc phosphated steel plate as in example 1 and tested. Test results are shown in Table 3.

EXAMPLE 9

100 parts of carboxyl group containing acrylic resin obtained by the copolymerization of 11.51 parts of methacrylic acid, 25 parts of styrene, 30.68 parts of methyl methacrylate, 2.80 parts of 2-hydroxyethyl methacrylate and 30.01 parts of 2-ethylhexyl methacrylate (Mn=2800, AV=75, Tg=65), 29.7 of the hardening agent (A) stated in Example 1, 49 parts of CR-50, 0.5 part of benzoin and 0.7 part of YF-3919 were used for the preparation of powder coating and thus obtained powder coating was applied and tested as in Example 1. However, in this experiment, the baking conditions were changed to 170° C. for 20 minutes. Test results are shown in Table 3.

COMPARATIVE EXAMPLE 1

100 parts of resin P-7309, 7.5 parts of TEPIC-G (triglycidyl isocyanurate, epoxy equivalent 110 g/eq. hardener, manufactured by Nissan Kagaku Kogyo), 59 parts of CR-50, 1.1 part of benzoin and 0.4 part of YF-3919 were used for the preparation of comparative powder coating. Thus obtained powder coating was applied and tested as in Example 1 and test results were shown in Table 4.

COMPARATIVE EXAMPLE 2

100 parts of polyester resin P-7309, 14.4 parts of the addition product (F) obtained by reacting 1 mol of sebacic acid and 2 moles of triglycidyl isocyanurate (epoxy equivalent 218 g/eq), 63 parts of CR-50, 1.1 part of benzoin and 0.4 part of YF-3919 were used for the preparation of powder coating and thus obtained powder coating was applied and tested as in Example 1. Test results are shown in Table 4.

COMPARATIVE EXAMPLE 3

100 parts of resin P-7309, 13.5 parts of the addition product (G) obtained by reacting 1 mole of 1,4-cyclohexane dicarboxylic acid and 2 moles of triglycidyl isocyanurate (epoxy equivalent 205 g/eq.), 63 parts of CR-50, 1.1 part of benzoin and 0.4 part of YF-3919 were used for the preparation of comparative powder coating. Thus obtained powder coating was applied and tested as in Example 1 and test results were shown in Table 4.

COMPARATIVE EXAMPLE 4

100 parts of resin P-7309, 12.2 parts of the addition product (H) obtained by reacting 1 mole of terephthalic acid and 2 moles of triglycidyl isocyanurate (epoxy equivalent 185 g/eq.), 63 parts of CR-50, 1.1 part of benzoin and 0.4 part of YF-3919 were used for the preparation of comparative powder coating. Thus obtained powder coating was applied and tested as in Example 1 and test results were shown in Table 4.

COMPARATIVE EXAMPLE 5

100 parts of the carboxyl group containing acrylic resin stated in Example 9, 11.3 parts of triglycidyl isocyanurate hardener, 42 parts of CR-50, 0.5 part of benzoin and 0.7 part of YF-3919 were used for the preparation of comparative powder coating. Thus obtained powder coating was applied and tested as in Example 1 and test results were shown in Table 4.

Test methods used and evaluation standards:
Processing property:
JIS 5400-6-16 evaluated by the number of coated plates insertable in the bended portion
OT: none of the coated plates insertable in the bended portion.
6T: 6 coated plates insertable in the bended portion.
Impact strength: tested by using DuPont Impact Tester (½ —500 g)
Hardness (solvent resistance test): xylene rubbing test ⊚ ... excellent
○ ... good   X ... no good Processability of coated plate when used a stored powder coating:

Powder coating was first stored at 35° C. for 2 months and then used as in Example 1. The abovementioned processing property test was carried out.

TABLE 1

| Example | \multicolumn{9}{c}{Composition} |
|---|---|---|---|---|---|---|---|---|---|
|  | 1 | 2 | 3 | 4 | 5 | 6 | 7 | 8 | 9 |
| P-7309 | 100 | 100 | 100 | 100 | 100 | 100 | 100 | 100 | — |
| GV-340 | — | — | — | — | — | — | — | — | — |
| acrylic resin | — | — | — | — | — | — | — | — | 100 |
| TGIC | 19.3 | ← | ← | 19 | 19.1 | 14 | 28.4 | 15.2 | 29.7 |
| Add product | A | ← | ← | B | C | D | E | A | A |
| TGIC | — | — | — | — | — | — | — | — | — |
| YD-128 | — | — | — | — | — | — | — | 2.5 | — |
| CR-50 | 67 | ← | ← | 66 | 66 | 63 | 71 | 65 | 49 |
| benzoin | 1.1 | ← | ← | ← | ← | ← | ← | ← | 0.5 |
| YF3919 | 0.4 | ← | ← | ← | ← | ← | ← | ← | 0.7 |

TABLE 2

| Comp-Example | \multicolumn{5}{c}{Composition} |
|---|---|---|---|---|---|
|  | 1 | 2 | 3 | 4 | 5 |
| P-7309 | 100 | 100 | 100 | 100 | — |
| GV-340 | — | — | — | — | — |
| acrylic resin | — | — | — | — | 100 |
| TGIC | — | 14.4 | 13.5 | 12.2 | — |
| Add product | — | F | G | H | — |
| TGIC | 7.3 | — | — | — | 11.3 |
| YD-128 | — | — | — | — | — |
| CR-50 | 60 | 63 | 63 | 62 | 42 |
| benzoin | 1.1 | ← | ← | ← | 0.5 |
| YF3919 | 0.4 | ← | ← | ← | 0.7 |

TABLE 3

| Example | \multicolumn{9}{c}{Test results} |
|---|---|---|---|---|---|---|---|---|---|
|  | 1 | 2 | 3 | 4 | 5 | 6 | 7 | 8 | 9 |
| Baking conditions |  |  |  |  |  |  |  |  |  |
| Temp (°C.) | 180 | 250 | 160 | 180 | 180 | 180 | 180 | 180 | 170 |
| min. | 20 | 5 | 20 | 20 | 20 | 20 | 20 | 20 | 20 |
| Appearance |  |  |  |  |  |  |  |  |  |
| Smoothness (naked eyes) | good | good | good | good | good | good | good | good | good |
| gloss (60°) | 88.9 | 89.2 | 89.0 | 88.4 | 87.2 | 87.9 | 89.4 | 86.6 | 86.9 |
| Processing property | OT | OT | OT | OT | OT | OT | OT | OT | — |
| impact strength (cm) | >50 | >50 | >50 | >50 | >50 | >50 | >50 | >50 | 45 |
| Pencil hardness | H | H | H | H | H | H | H | H | H |
| solvent resistance | ⊙ | ⊙ | ⊙ | ⊙ | ⊙ | ⊙ | ⊙ | ⊙ | ⊙ |
| Processability after storage | OT | OT | OT | OT | OT | OT | OT | OT | — |

TABLE 4

| Comparative Example | \multicolumn{5}{c}{Comparative Test results} |
|---|---|---|---|---|---|
|  | 1 | 2 | 3 | 4 | 5 |
| Baking conditions |  |  |  |  |  |
| Temp (°C.) | 180 | 180 | 180 | 180 | 180 |
| min. | 20 | 20 | 20 | 20 | 20 |
| Appearance |  |  |  |  |  |
| Smoothness (naked eyes) | good | good | good | good | good |
| gloss (60°) | 87.6 | 89.1 | 86.6 | 84.3 | 85.9 |
| Processing property | 6T* | OT | OT | 6T* | — |
| impact strength (cm) | >50 | >50 | >50 | 30 | 35 |
| Pencil hardness | H | F | H | H | H |
| solvent resistance | ○ | ○ | ⊙ | ⊙ | ○ |
| Processability after storage | 6T* | OT | 5T | 6T* | — |

* = or less

TABLE 5

| \multicolumn{3}{c}{materials used} |  |
|---|---|---|
|  | Maker | remark |
| P-7309 | EMS | polyester resin Mn = 4,000 |
| GV-340 | Nihon Upica | polyester resin AV = 33, Mn = 5,500 |
| TEPIC-G | Nissan Kagaku | hardener AV = 33, triglycidyl isocyanurate eq. = 110 |
| YD-128 | Tohto Kasei | hardener bisphenol A epoxy eq. = 190 |
| Typaque CR-50 | Ishihara Sangyo | pigment titanium oxide |
| benzoin | reagent | pinehol controlling agent |
| YF-3919 | Toshiba Silicone | surface regulating agent silicone |

What is claimed is:

1. A powder coating composition comprising, as main components, (A) a carboxyl group containing resin having a number average molecular weight of 1,000–30,000, an acid value of 5–200 KOH mg/g and a glass transition temperature of 20° C.–120° C., and (B) a polyglycidyl compound having, on average, 2 to 6 glycidyl groups in its molecule, obtained by the addition reaction of a polyester oligomer having 2 or more carboxyl groups in its molecule and having a number average molecular weight of 200–1,200, with an epoxy compound of the formula (I):

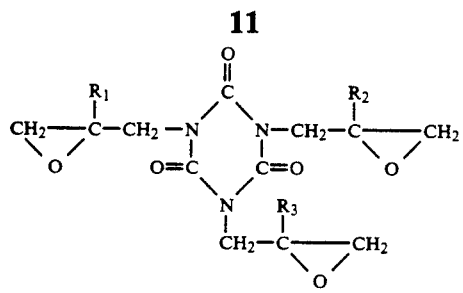

in which $R_1$, $R_2$ and $R_3$ are the same or different groups and each represents hydrogen atom or methyl group, the ratio of carboxyl groups in said (A) resin to glycidyl groups in said (B) polyglycidyl compound being, in terms of functional group equivalent ratio, 0.5 to 2.0.

2. A powder coating according to claim 1, wherein said (A) resin is polyester resin.

3. A powder coating according to claim 1, wherein said (A) resin is acrylic resin.

* * * * *